Sept. 20, 1966  C. E. JACKSON  3,273,826
VARIABLE AIRFOIL HIGH-LIFT SLAT AND SLOT FOR AIRCRAFT
Filed March 3, 1965  3 Sheets-Sheet 2

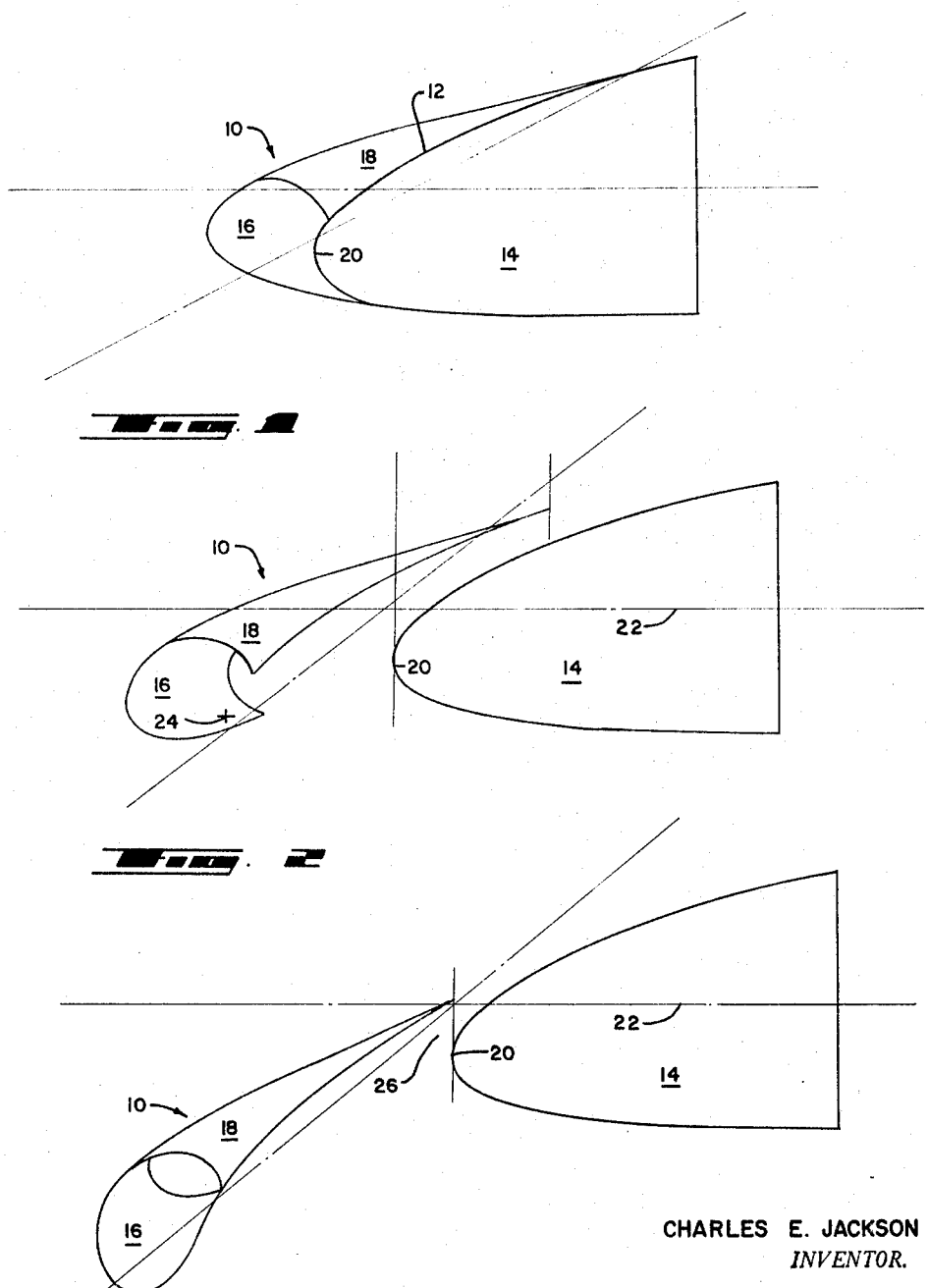

CHARLES E. JACKSON
INVENTOR.

BY *Charles F. Woodward*
ATTORNEY

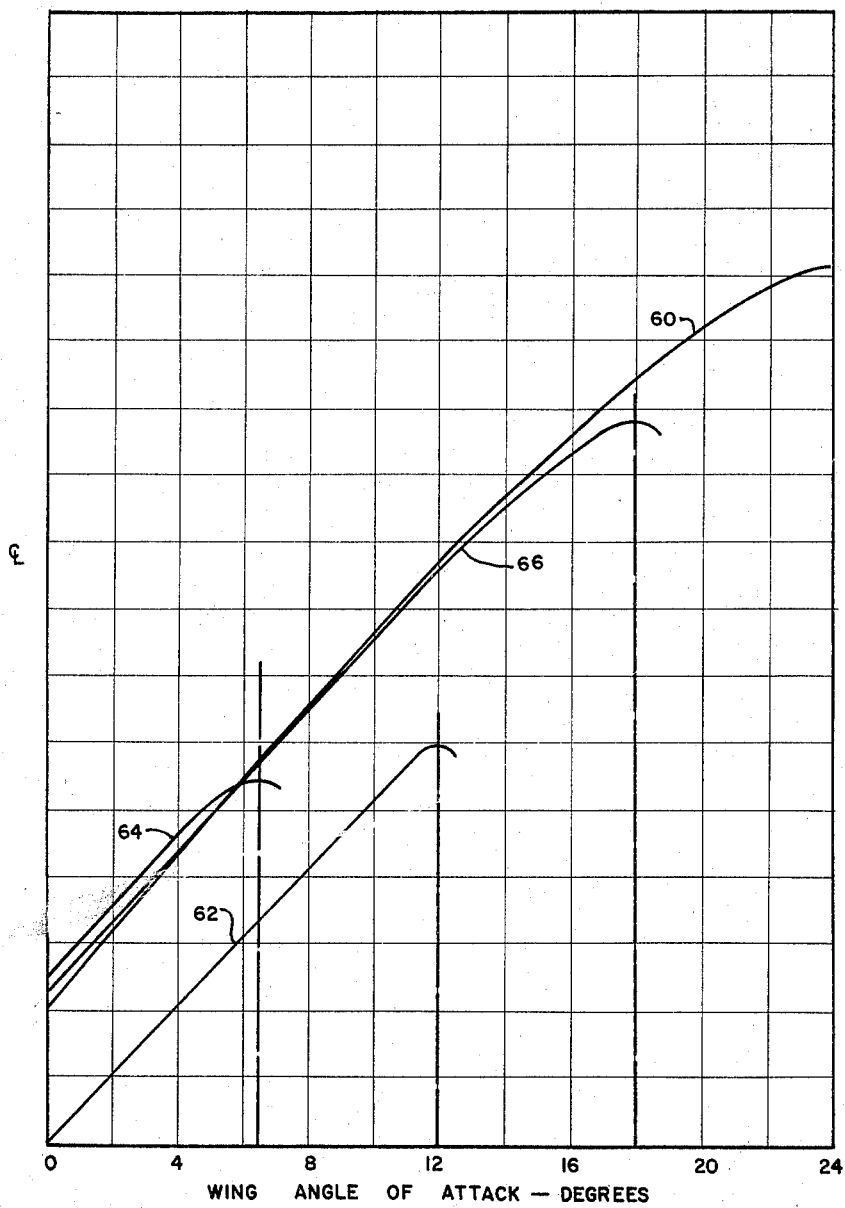

United States Patent Office 3,273,826
Patented Sept. 20, 1966

3,273,826
VARIABLE AIRFOIL HIGH-LIFT SLAT AND
SLOT FOR AIRCRAFT
Charles E. Jackson, Fort Worth, Tex., assignor to General
Dynamics Corporation, Fort Worth, Tex., a corporation of Delaware
Filed Mar. 3, 1965, Ser. No. 436,780
4 Claims. (Cl. 244—42)

The present invention relates generally to high-lift aerodynamic devices.

More particularly the invention relates to an auxiliary airfoil which is superimposed upon, and is extendable from, the leading edge of an aircraft wing.

Such auxiliary airfoil, being capable of varying its physical configuration in a programed manner while in flight, significantly increases the spectrum of speeds, angles of attack and resulting coefficients of lift available from the basic wing-auxiliary airfoil combination. Such as auxiliary airfoil is commonly referred to in the art as a slat.

Supersonic aircraft as presently envisioned have the need for an extremely thin wing, that is wings with a minimum of camber. Such need is becoming more and more pressing inasmuch as where speeds of such aircraft increase, measures must be taken to retard resultant aerodynamic compressibility. This may be accomplished by utilizing thin wings to reduce the speed of air over the upper surfaces. However, thin wings of necessity, must have extremely acute leading edges, which, in conjunction with a minimum of camber, result in relative prorogation of aerodynamics compressibility and drag associated therewith.

As it is the differential in pressure resulting from the unequal airstream speeds adjacent the upper and lower surfaces of a wing which produces lift, a wing having a minimum of camber produces very little lift at low speeds and low angles of attack and is therefore subject to stalling at relatively high speeds. For this reason supersonic airfoils generally do not rely upon camber for lift, but rather on angle of attack. It is obvious that the slower the speed of the wing relative to the ambient air, the greater the angle of attack must be in a supersonic wing to generate lift due to the substantial lack of any lift at low speeds. Additional problems are encountered at low speeds and high angles of attack by aerodynamic separation which destroys what lift may be generated.

Supersonic aircraft must be stable but also be capable of producing suitable lift at reasonable speed for reasonably short landing and take-off operations. Subsonic or low speed operation requires a cambered wing, for camber is necessary as hereinabove stated to achieve lift at subsonic speeds and low angles of attack. Obviously, the more lift available, the shorter the take-off roll and the less speed that will be required for flight. Such is also the case for landing, for the more lift available, the lower the stall speed for aircraft, thus permitting slower, shorter landings.

The commercial and military aircraft being developed for the envisioned future are required to operate at or above Mach 2.5 (well above supersonic) while simultaneously being capable of operation from airfields designed and built for subsonic aircraft. It is self-evident that airfoils suited for supersonic flight are not wholly suitable for subsonic operation; therefore, design compromises must be normally made to achieve a median acceptable range of operation.

Several devices have been evolved in the past to augment the lift generating capability of supersonic airfoils to increase their effective range of operation. Among these are wing leading edge slats to which this invention is primarily directed.

There are various types of slats, one of which is the conventional slat, which is merely a small airfoil superimposed upon the upper surface of the leading edge of the basic thin section airfoil and in operation is extended by some means to a position generally forward of and below the chord line of the basic wing. This airfoil is operable when extended to increase the camber and chord of the parent airfoil, thus, in some measure, increasing the lift of the associated wing. It is readily apparent that the conventional slat itself may possess very little camber in order to remain within the original wing cross sectional geometry.

Another type slat employed is exemplified by the Roed slat. This slat is stored in an area in the lower surface of the wing adjacent to its leading edge and is swivelled with suitable linkages into a position generally the same as that obtainable by the conventional slat. The prime advantage of the Roed slat over the conventional slat resides in the slight increase in camber which may be obtained due to the area in which the slat is stored.

Other attempts have been made to increase the capability of a supersonic wing to generate lift. One such attempt is revealed in United States Patent No. 2,755,039 and is somewhat relative to the present invention. It comprises a means of drooping the leading edge of an airfoil and opening a slot immediately behind the leading edge. This is accomplished by opening panels in the upper and lower surfaces of the basic wing and subsequently causing the leading edge to droop by means of linkages.

Several disadvantages are inherent in the prior art. Salient among these is the inability of such devices to vary their physical geometry, i.e., they are unable to alter their chord length and camber. This is extremely important for it provides a means for obtaining the optimum aerodynamic shape for substantially any condition. Further, as hereinabove mentioned, supersonic wings possess extremely acute leading edges and thin profiles; therefore, it is practically impossible to house or store an efficient slat, having sufficient camber and chord length for efficient subsonic operation, within the original outline of the supersonic airfoil. The Roed slat approach to this problem allows a somewhat more cambered and hence more efficient subsonic slat to be obtained. However, any appreciable increase in camber or slat thickness leads to structural difficulties immediately adjacent the leading edge of the wing. This is due to the void area in the wing which receives the Roed slat in stored position. This void area is not capable of transmitting or carrying the structural loads, of necessity, encountered in a typical wing. Further, operation of this type slat generally meets with obstructions, in the form of other necessary structures, during its extension and retraction, such as protruding or subtending wing mounted nacelles and arms stores which necessitate segmented slat construction, obviating the possibility of a full span device.

In the system having the drooped leading edge, mentioned above, significant aerodynamic advantage is noted. This with the possible exception of such system allowing a greater angle of attack to be achieved before aerodynamic separation occurs. No significant increase in wing camber or chord length is apparent. This is primarily due to the inability of such system to move away from the leading edge of the basic wing.

The present invention overcomes the disadvantages of the prior art through employment of a multi-segment slat, i.e., an airfoil having two or more segments which are operable to sequentially rotate about a multiplicity of locus points. Such airfoils are mounted upon tracks capable of being extended in a predetermined trajectory, such as described in the Bracka et al. copending application, Serial No. 388,191. Thus it is capable of altering its aerodynamic shape while being extended.

Such capability is extremely important in that it permits not only the theoretical camber and chord length of the wing to be altered, but also changes the camber and chord length of the slat itself. This obviously allows a much more efficient slat to be obtained from thin cross-section airfoils than has heretofore been possible.

The slat of the present invention is, in the preferred embodiment, segmented into a leading portion and a trailing portion. The leading portion may then be rotated about a fixed point relative to the trailing portion. In another embodiment, three segments are utilized. This construction permits a slat having substantially more camber and chord length than those of the present art to be superimposed upon or housed within a supersonic airfoil.

The present invention increases the efficiency of an aircraft wing in four related areas. All of these areas are combined in result to significantly increase the lift and angle of attack obtainable prior to aerodynamic separation of a supersonic wing at subsonic speeds, while permissive of higher g maneuvers at transonic speeds. Further, loiter capability of an aircraft, i.e., extremely efficient low speed operation is made possible by the present invention.

The primary way in which the efficiency of the wing is increased is through the ability of the slats to change their aerodynamic shape, thus altering their camber and chord length in flight. More specifically, a slat shape may be obtained in flight which possesses sufficient camber for efficient operation at low speeds while simultaneously, through its multi-segment construction, being capable of storage within the cross-sectional geometry of a supersonic airfoil.

In the present invention, as a consequence of increased camber, obtained through rotation of the nose portion, a relative increase in chord length is obtained. Such increase in slat chord length and camber greatly increases slat efficiently, thus significantly increasing the lift obtainable from a supersonic airfoil.

Another way lift is increased is through the ability of the nose portion of the slat to be rotated into the proper position relative to the impinging airstream. This is important since it provides a means of relocating the stagnation point of the airstream as the angle of attack is increased; thereby allowing the airstreams to be adjusted relative to the leading edge of the slat and avoiding negotiation of the sharp radius and long distances along the slat's upper surface. Hence significant delays in aerodynamic separation at higher angles of attack are effected.

Still another area resides in the latitude of choice afforded the designer through the multi-segment construction. A slat nose having a gradual and smoother slope may be secured for the slat's upper surface and a blunter leading edge may be obtained. These designs promote smooth airflow around the slat and thus increase the overall efficiency.

Another means is the ability of the slat of the present invention to relocate the pressure peak created by the airstream around the slat leading edge by means of rotation of the nose member portion relative to the remaining portions. This movement of the pressure peak allows more recovery toward the trailing portion of the slat resulting in higher slat loads, hence, increased lift.

The above is directly related to the pattern of the streamline around the slat-wing system. In the case of a conventional slat-wing combination positioned at a high angle of attack for generating a large lift, the stagnation point of the airflow meeting the system is considerably behind the slat leading edge on the under surface of the slat. Any streamline which is to go over the upper wing surface must first accelerate to great velocities, in some cases to supersonic speeds, in order to negotiate the leading edge of the slat. These high velocities around the leading edge create the high leading edge suction peak for which the conventional type slat is noted.

The present invention permits the nose to be rotated in order to present a smoother, shorter path to the stream line, thus allowing maximum velocity and consequently maximum pressure (pressure peak) which may be moved aft of the slat nose. Therefore the pressure peak is permitted to build up more gradually and the slat is thus functional to higher angles of attack prior to aerodynamic separation occurring. Obviously, when separation does occur, lift is destroyed. These two factors, relocation of the stagnation point and pressure redistribution plus the increases in wing chord and camber and slat chord and camber, combine to greatly increase the lift of an airfoil to higher angles of attack.

Therefore an object of the present invention is to provide a multi-segment, auxiliary, lift-augmenting airfoil or slat capable of varying its chord length and camber, hence the auxiliary airfoil aerodynamic configuration, which slat may be propelled away and extended from the associated leading edge of an aircraft wing through a prescribed trajectory in such a manner as to simultaneously increase the theoretical chord length and camber of the associated wing, thus engendering to such wing substantially improved lifting capabilities through a greater angle of attack.

Another object of the present invention is to provide means for varying the flow pattern around a slat-wing system by relocating the pressure peaks and stagnation points of the impinging airstream through rotation of at least a portion of the slat to achieve the most efficient position.

Another feature of the present invention is the provision of a slot between the wing leading edge and the trailing portion of the slat. At high angles of attack the slot functions to generate energized air which will "stick to" or follow the upper surface of the airfoil. This results in driving the airstream further along the airfoil upper surface prior to aerodynamic separation at high angles of attack.

FIGURE 1 is a schematic illustration of a two piece slat of the present invention in combination with a basic wing, the slat being in the stowed position.

FIGURE 2 is a schematic illustration of the present invention during extension of the slat and showing the leading portion of the slat partially rotated relative to the trailing portion.

FIGURE 3 is a schematic illustration of a preferred embodiment of the invention showing the slat fully extended and the nose portion rotated into the most efficient position for high angles of attack.

FIGURE 6 is a graphic illustration of lift versus angle of attack curves between wings with and without lift augmenting devices.

Figure 4:
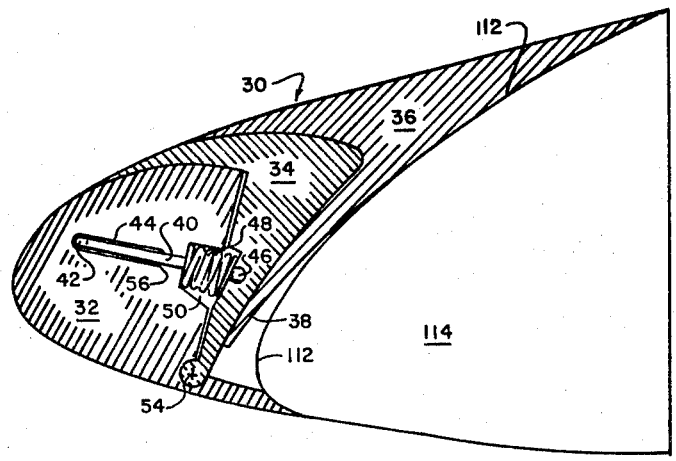
FIGURE 4 is a schematic illustration of a second embodiment comprising three segments and shown in the stowed position.

The preferred embodiment of the device of the present invention is illustrated by FIGURE 1 which shows the object slat in its stowed or stored position. As therein shown, the slat system 10 embodying the invention comprises a nose or leading portion 16 and trailing portion 18. In this position slat system 10 is retracted and superimposed upon forward upper surface 12 of aircraft wing 14, only the forward portion of which is illustrated. Of specific interest here is the illustrated capability of the slat system to maintain substantially the same or a better acute leading edge which is mandatory for supersonic airfoils. This is due to the way nose portion 16 and trailing portion 18 of slat system 10 cup about wing leading edge 20.

A multiple of intermediate positions are obtainable from the system of the present invention. As shown in FIGURE 2, slat system 10 is projected through a forward and downward trajectory relative to reference chord line 22. This increases the theoretical chord length and camber of basic wing 14. Further, the nose portion 16 of slat system 10 is caused to rotate counterclockwise about pivot point 24, thus also increasing the slat chord length and camber. Such intermediate positions may be obtained by slat extension mechanisms such as disclosed in the copending application of Bruno W. Bracka et al., Serial No. 388,191. With the slat system in the fully extended position, as illustrated in FIGURE 3, slat system 10 is considerably below reference chord line 22 and is at the furthest point away from leading edge 20 of basic wing 14. Leading portion 16 of slat system 10 is rotated into such position that the resultant configuration provides the maximum chord length and camber obtainable from this specific arrangement.

FIGURE 3 further illustrates the extremely efficient slot 26 which is formed by slat system 10 during and as a result of its forward movement. The two airfoils 10 and 14 are positioned so that a minimum aerodynamic friction and turbulence are induced thereby. Slot 26 engenders high energy airstreams which remain coetaneous with the upper surface 12 of basic wing 14 for greater distances and thus assist in the prevention of airflow separation with its accompanying loss of lift.

The difference in physical configuration of the slat system 10 illustrated in FIGURE 1 relative to the system after full rotation of nose portion 16, illustrated in FIGURE 3, will be noted. Obviously, if the slat shape exemplified in FIGURE 3 were superimposed upon aircraft wing 14 without rotation of nose member 16, the resulting leading edge would not be suitable for supersonic operation.

Figure 5:
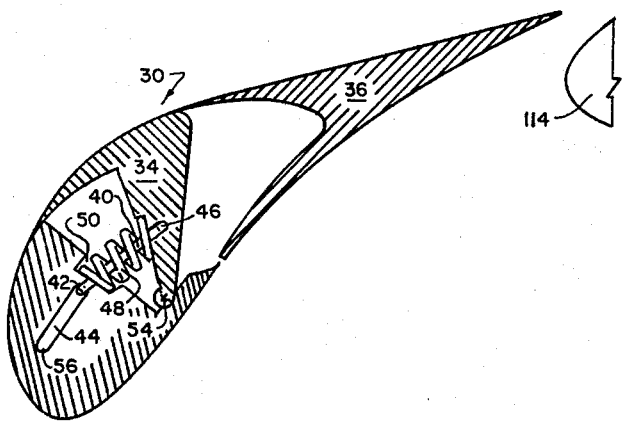
FIGURE 5 is similar to FIGURE 4 but shows the slat in the fully extended position.

A second embodiment is illustrated in FIGURES 4 and 5. As therein shown, this embodiment is comprised of a composite system 30 having three component segments, a leading edge portion 32, an intermediate segment 34 and a trailing segment 36.

Such articulated segments are shown in retracted position in FIGURE 4; nose segment 32 being congruent with intermediate segment 34 which, in turn, is congruent with trailing segment 36. Segment 36 is contoured on the lower surface 38 to congruously lie along surface 112 of wing or basic airfoil 114. Interconnecting leading portion 32 and intermediate segment 34 is linkage member 40. One end 42 of which is slideably received in slot 44 of leading segment 32, and the opposite extremity 46 is pivotally received by intermediate segment 34. Spring 48, seated in recess 50 in nose segment 32, acts against forward wall 52 of intermediate segment 34, thus providing a bias load between segments 32 and 34 insuring proper spacing of segment 34 during the extension thereof. Segments 32 and 34 are pivotally attached for rotation about pivot point 54. As apparent from FIGURE 4, when the composite slat is in its retracted position a relatively sharp leading edge is presented to the airstream. However, the configuration is capable of effecting significant increases, when extended, in slat chord length and camber relative to the preferred embodiment.

As best seen in FIGURE 5, when composite slat system 30 is extended, nose segment 32 rotates about pivot 54 relative to trailing segment 36. During this counterclockwise rotation, link 40 tends to remain stationary due to its fixation in intermediate segment 34 at point 46. This causes link protrusion 42 to slide in nose slot 44 until it contacts slot end 56, causing segment 34 to then follow segment 32 in the latter's rotation. During the initial movement of segment 32, compression spring 48 expands, assuring proper spacing and bias between the two segments. Pivot point 38 is, of course, fixed relative to an extending track (not shown) such as shown and described in heretofore referenced copending application, Serial No. 388,191. The present embodiment may employ the mechanism shown in the referenced application, with the addition only of link 40 and its associated elements.

It is obvious that an infinite number of slat shapes may be sequentially achieved by the airfoil of the second embodiment.

FIGURE 6 graphically illustrates the efficiency and advantages of the present invention. The X-axis is representative of the wing angle of attack α in degrees, while the Y-axis is representative of an increasing coefficient of lift. As shown therein, four wing configurations, tested on a model in a wind tunnel have been plotted. All data illustrated in FIGURE 6 were derived from a model utilizing a 9 percent $t/c$ airfoil for the wing. The tests were conducted for a complete airplane model, with the exception of horizontal tail, rather than two-dimensional. The slats were full span as well as the flaps which were a double slotted configuration. A clean wing 62 stalled at an angle of attack near 12°. A clean wing with the addition of the flap 64 achieved much larger coefficients of lift at low angles of attack but stalled at an early angle of attack near 6.5° having generated near the same maximum lift as the clean wing 62. The most successful of the present state-of-the-art combinations comprising a clean wing having a flap and conventional slat, illustrated at 66 stalls out at an angle of attack of 18°, although the coefficient of lift achievable is only slightly less than double the first two wings at the respective maximum angles of attack. A clean wing and flap in combination with the nose rotating slat of the present invention 60 achieves a significantly higher coefficient of lift at substantially greater angles of attack than do the prior art devices, and does not stall until an α of 24° is reached. In addition, its performance is as good as or better than prior art devices at angles of attack up to the maximums of the prior devices. It is obvious from the graph that a given wing, a 9 percent $t/c$ airfoil in the present instance, is capable of achieving a significantly greater lift and angle of attack through utilization of the present invention.

As thus described the present invention resides in a plural section airfoil in which at least the leading segment is operable to rotate relative to the trailing segment. The plural section airfoil, when employed with a basic wing as a leading edge slat, is operable to significantly increase the lift obtainable from a given airfoil to a greater angle of attack than heretofore obtainable.

Therefore what is desired to secure by Letters Patent is:

1. A composite airfoil structure comprising a primary supersonic wing configuration having a thin leading edge, an auxiliary airfoil structure movably superimposed upon said primary wing, said auxiliary airfoil having a variable geometry nose portion of substantially the same configuration as said primary wing leading edge configuration and operable on programed extension to rotate a portion of said auxiliary airfoil to substantially increase both chord and camber of said auxiliary airfoil and simultaneously the chord and camber of said composite airfoil structure to thereby vary the flow pattern over the composite wing configuration through relocation of impinging airstream pressure peaks and stagnation points, wherein said auxiliary airfoil structure comprises a nose segment, an intermediate segment, and a trailing segment, (A) said nose segment rotatable with respect to said intermediate segment and said trailing segment, (B) said intermediate segment responsive to rotational movement of said nose segment and rotationally extensible outwardly and downwardly with respect to said trailing segment, said intermediate segment being storable substantially within said trailing segment and nestable with said nose segment.

2. A composite airfoil structure defining a wing configuration having a leading edge, said structure comprising:

a primary supersonic fixed wing structure having a thin leading edge and a bi-segmented auxiliary airfoil compenent longitudinally movably superimposed upon said primary wing, and of substantially the same configuration as said primary wing leading edge, said auxiliary airfoil having a variable geometry nose portion and a trailing portion, said nose portion rotatable with respect to said trailing portion about a pivot in response to a programed outward and downward trajectory movement of said pivot point in respect to said fixed wing structure, said nose portion rotation and auxiliary airfoil trajectory movement increasing both chord length and camber of said auxiliary airfoil structure and simultaneously the chord and camber of said composite airfoil structure through relocation of impinging airstream pressure peaks and stagnation points.

3. In an airfoil structure comprising a primary wing configuration having a contoured leading edge, means operable to relocate the stagnation point, obtain pressure redistribution and to increase the wing chord and camber, said means comprising:

an auxiliary airfoil having at least a nose segment and a trailing segment defining substantially the same leading edge configuration as said primary wing when superimposed thereon with said nose portion nested against the primary wing leading edge and said trailing portion superimposed upon a mating upper portion of said primary wing, said auxiliary airfoil operable to move forwardly and downwardly in respect to said primary wing, said nose segment rotatable with respect to said trailing segment to thereby vary the chord and camber of said auxiliary airfoil.

4. An airfoil structure comprising:
(A) a primary wing having a contoured leading edge,
(B) variable geometry auxiliary airfoil means superimposed upon said primary wing and having substantially the same configuration as the leading edge portion of said primary wing when superimposed thereon, said means comprising a variable geometry nose portion and fixed geometry trailing portion, said means extensible forwardly and downwardly from its superimposed position, said trailing edge maintaining a substantially fixed relationship to the upper surface of said primary wing leading edge portion throughout the extension therefrom, said nose portion rotatable relative to said trailing portion at substantially the forwardmost extension thereof effective to substantially change the chord and camber of said primary wing and of said auxiliary airfoil.

References Cited by the Examiner

UNITED STATES PATENTS

| | | | |
|---|---|---|---|
| 1,631,259 | 6/1927 | Gilmore | 244—42 |
| 2,365,382 | 12/1944 | Bolhon | 244—42 |
| 2,755,039 | 7/1956 | Davie | 244—42 X |
| 3,089,666 | 5/1963 | Quinzler | 244—42 X |

FOREIGN PATENTS 878,657   1/1943   France.

MILTON BUCHLER, *Primary Examiner.*

B. BELKIN, *Assistant Examiner.*